US008068415B2

(12) United States Patent
Mraz

(10) Patent No.: US 8,068,415 B2
(45) Date of Patent: Nov. 29, 2011

(54) SECURE ONE-WAY DATA TRANSFER USING COMMUNICATION INTERFACE CIRCUITRY

(75) Inventor: Ronald Mraz, South Salem, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 377 days.

(21) Appl. No.: 11/787,778

(22) Filed: Apr. 18, 2007

(65) Prior Publication Data
US 2008/0259929 A1    Oct. 23, 2008

(51) Int. Cl.
*H04J 1/16*    (2006.01)
(52) U.S. Cl. ........ 370/230; 370/229; 370/231; 370/463; 709/250
(58) Field of Classification Search .......... 370/229–241, 370/431, 463; 709/250
See application file for complete search history.

(56) References Cited

U.S. PATENT DOCUMENTS

| | | | |
|---|---|---|---|
| 4,523,087 A | 6/1985 | Benton | |
| 4,672,601 A * | 6/1987 | Ablay | 370/277 |
| 4,829,596 A | 5/1989 | Barina | |
| 5,039,194 A | 8/1991 | Block et al. | |
| 5,069,522 A | 12/1991 | Block et al. | |
| 5,136,410 A | 8/1992 | Heiling et al. | |
| 5,251,054 A | 10/1993 | Lynn | |
| 5,282,200 A | 1/1994 | Dempsey et al. | 370/245 |
| 5,335,105 A | 8/1994 | Carlton | |
| 5,343,323 A | 8/1994 | Lynn et al. | |
| 5,495,358 A | 2/1996 | Bartig et al. | |
| 5,703,562 A | 12/1997 | Nilsen | |
| 5,769,527 A * | 6/1998 | Taylor et al. | 362/85 |
| 5,983,332 A * | 11/1999 | Watkins | 711/202 |
| 6,049,877 A * | 4/2000 | White | 726/5 |
| 6,058,421 A | 5/2000 | Fijolek et al. | |
| 6,108,787 A | 8/2000 | Anderson et al. | |

(Continued)

FOREIGN PATENT DOCUMENTS
WO   WO 2004/105297 A2   12/2004

OTHER PUBLICATIONS

Wikipedia. Screen-printing. <http://web.archive.org/web/20060304084522/http://en.wikipedia.org/wiki/Screen-printing>. Mar. 4, 2006.*

(Continued)

*Primary Examiner* — Hassan Kizou
*Assistant Examiner* — Ashil Farahmand
(74) *Attorney, Agent, or Firm* — Amster, Rothstein & Ebenstein LLP

(57) ABSTRACT

Network interface circuitry for a secure one-way data transfer from a sender's computer ("Send Node") to a receiver's computer ("Receive Node") over a data link, such as an optical fiber or shielded twisted pair copper wire communication cable, comprising send-only network interface circuitry for transmitting data from the Send Node to the data link, and receive-only network interface circuitry for receiving the data from the data link and transmitting the received data to the Receive Node, wherein the send-only network interface circuitry is configured not to receive any data from the data link, and the receive-only network interface circuitry is configured not to send any data to the data link. The network interface circuitry may use various interface means such as PCI interface, USB connection, FireWire connection, or serial port connection for coupling to the Send Node and the Receive Node.

29 Claims, 8 Drawing Sheets

U.S. PATENT DOCUMENTS

| | | | |
|---|---|---|---|
| 6,262,993 B1* | 7/2001 | Kirmse | 370/463 |
| 6,384,744 B1* | 5/2002 | Philyaw et al. | 341/50 |
| 6,415,329 B1 | 7/2002 | Gelman et al. | |
| 6,498,667 B1 | 12/2002 | Masucci et al. | |
| 6,546,422 B1 | 4/2003 | Isoyama et al. | 709/225 |
| 6,654,565 B2 | 11/2003 | Kenny | |
| 6,665,268 B1 | 12/2003 | Sato et al. | 370/242 |
| 6,728,213 B1* | 4/2004 | Tzeng et al. | 370/235 |
| 6,731,830 B2 | 5/2004 | Lauder et al. | |
| 6,792,432 B1 | 9/2004 | Kodavalla et al. | 707/103 R |
| 6,807,166 B1 | 10/2004 | Ohura | 370/352 |
| 6,925,257 B2 | 8/2005 | Yoo | |
| 6,934,472 B2 | 8/2005 | Chang et al. | |
| 6,940,477 B2 | 9/2005 | Moon et al. | |
| 6,988,148 B1 | 1/2006 | Sheth | 709/245 |
| 7,016,085 B2 | 3/2006 | Gonzalez et al. | 358/405 |
| 7,095,739 B2 | 8/2006 | Mamillapalli et al. | 370/390 |
| 7,246,156 B2 | 7/2007 | Ginter et al. | |
| 7,260,833 B1 | 8/2007 | Schaeffer | |
| 7,339,929 B2 | 3/2008 | Zelig et al. | 370/390 |
| 7,356,581 B2 | 4/2008 | Hashimoto | 709/224 |
| 7,370,025 B1 | 5/2008 | Pandit | 707/1 |
| 7,389,323 B2 | 6/2008 | Tanimoto | 709/206 |
| 7,440,424 B2 | 10/2008 | Nam et al. | 370/310 |
| 7,454,366 B2 | 11/2008 | Kato | 705/21 |
| 7,512,116 B2 | 3/2009 | Ohura | 370/352 |
| 7,529,943 B1 | 5/2009 | Beser | 713/181 |
| 2002/0003640 A1 | 1/2002 | Trezza | |
| 2002/0118671 A1 | 8/2002 | Staples et al. | 370/352 |
| 2003/0058810 A1 | 3/2003 | Petronic | |
| 2003/0119568 A1 | 6/2003 | Menard | |
| 2003/0195932 A1 | 10/2003 | Tanabe et al. | 709/205 |
| 2004/0022539 A1 | 2/2004 | Bannister et al. | |
| 2004/0103199 A1 | 5/2004 | Chao et al. | 709/228 |
| 2004/0131357 A1 | 7/2004 | Farmer et al. | |
| 2004/0236874 A1 | 11/2004 | Largman et al. | |
| 2005/0033990 A1 | 2/2005 | Harvey et al. | |
| 2005/0185961 A1 | 8/2005 | Bhalla et al. | |
| 2005/0201373 A1 | 9/2005 | Shimazu et al. | 370/389 |
| 2005/0202723 A1 | 9/2005 | Arnold et al. | |
| 2005/0259587 A1 | 11/2005 | Wakumoto et al. | 370/248 |
| 2006/0114566 A1* | 6/2006 | Ohmori et al. | 359/566 |
| 2006/0153092 A1 | 7/2006 | Matityahu et al. | |
| 2006/0153110 A1* | 7/2006 | Morgan et al. | 370/310 |
| 2006/0173850 A1 | 8/2006 | Auer et al. | 707/10 |
| 2006/0209719 A1 | 9/2006 | Previdi et al. | |
| 2007/0041388 A1* | 2/2007 | Russell | 370/400 |
| 2007/0223158 A1* | 9/2007 | Ma et al. | 361/56 |
| 2008/0008207 A1* | 1/2008 | Kellum | 370/433 |
| 2009/0024612 A1 | 1/2009 | Tang et al. | 707/5 |

OTHER PUBLICATIONS

Douglas W. Jones and Tom C. Bowersox, "Secure Data Export and Auditing Using Data Diodes," Department of Computer Science, Univ. of Iowa, Iowa City, IA.

Douglas W. Jones and Tom C. Bowersox, "Secure Data Export and Auditing Using Data Diodes" (EVT 06 Data Diode Paper) Department of Computer Science, Univ. of Iowa, Iowa City, IA (http://www.usenix.org/events/evt06/techfull_papers/jones/jones_html).

Douglas W. Jones and Tom C. Bowersox, "Secure Data Export and Auditing Using Data Diodes," Department of Computer Science, Univ. of Iowa, Iowa City, IA (http://www.cs.uiowa.edu/~jones/voting/diode).

Douglas W. Jones, "RS-232 Data Diode—Tutorial and Reference Manual," University of Iowa, Jul. 28, 2006.

M. Anderson, C. North, J. Griffin, R. Milner, J. Yesberg, K. Yiu, "Starlight: Interactive Link," 1996, Defence Science & Technology Organisation, Salisbury, South Australia, Australia.

"Interactive Link White Paper," Jul. 27, 2001, Tenix Defence Pty Ltd, Mawson Lakes, South Australia, Australia.

"Veto Uni-directional Network Bridge and Data Pump Applications White Paper", UNB and DPA White Paper by Tenix Datagate Pty Ltd, 2002, pp. 1-6.

Westmacott J., "Unidirectional Networking: GIAC Security Essential Certification Practical Assignment Version 1.46", SANS Institute, 2003.

Nilsen, Curt A., Information Security implementations for Remote Monitoring; Symposium on Int'l Safeguards, Int'l Atomic Energy Agency, Vienna, Austria, Oct. 13-17, 1997.

Nilsen, Curt A. et al., The Secure Data Mirror; INMM; Nuclear Materials Management; vol. XXVII (No. 2), 39th Annual Mtg. Proceedings, Naples, FL, Jul. 26-30, 1998, pp. 1322-1327.

International Search Report of the International Searching Authority relating to International Application No. PCT/US08/60512, mailed Jun. 27, 2008.

Written Opinion of the International Searching Authority relating to International Application No. PCT/US08/60512, mailed Jun. 27, 2008.

* cited by examiner

SECURE ONE-WAY DATA TRANSFER USING COMMUNICATION INTERFACE CIRCUITRY

FIELD OF INVENTION

The present invention relates generally to the security of data networks. More particularly, the present invention relates to a one-way data transfer system using network interface circuitry that connects two network computers by configuring one network interface circuit to operate as a send-only gateway and configuring the other network interface circuit as a receive-only gateway for a secure data network.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, conventional network security devices such as firewalls may not provide sufficiently reliable protection from undesired data disclosure.

Alternative network security methods and devices have been devised to address the network security concern. For example, U.S. Pat. No. 5,703,562 to Nilsen ("the '562 patent"), the contents of which are hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system. In the one-way data transfer system shown in FIG. 1, two computing platforms (or nodes) 1 and 2 (respectively, "the Send Node" and "the Receive Node") are connected to the unsecured external network 4 ("the source network") and the secure network 5 ("the destination network"), respectively. The Send Node is connected to the Receive Node by a one-way optical data link 3, which may comprise, for example, a high-bandwidth optical fiber. This one-way optical data link 3 may be configured to operate as a unidirectional data gateway from the source network 4 to the secure destination network 5 by having its ends connected to an optical transmitter on the Send Node and to an optical receiver on the Receive Node.

This configuration physically enforces one-way data transfer at both ends of the optical fiber connecting the Send Node to the Receive Node, thereby creating a truly unidirectional one-way data link between the source network 4 and the destination network 5 shown in FIG. 1. Unlike the conventional firewalls, one-way data transfer systems based on a one-way optical data link are designed to transfer data or information only in one direction and it is physically impossible to transfer data or information of any kind in the reverse direction. No information or data of any kind, including handshaking protocols such as those used in transfer protocols such as TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way optical data link ensures that data residing on the isolated secure computer or network is maximally protected from any undesired and unauthorized disclosure.

Typically, the computing platforms connected to a data network are personal computers or workstations. To implement a one-way data transfer system such as those discussed above, to achieve and maintain the unidirectionality of data flow over a one-way optical data link, the personal computer at the Send Node must be configured so that only the optical transmitter coupled to the Send Node interfaces one end of the one-way optical data link and, on the other hand, the personal computer at the Receive Node must be configured so that only the optical receiver coupled to the Receive Node interfaces the other end of the one-way optical data link.

However, constructing special purpose, "send-only" or "receive-only" computers with optical emitters or detectors permanently installed and hardwired therein may not be the most efficient and flexible way to construct and operate a one-way data transfer system. Such a system would require, for example, that one has to designate in advance which computers are going to be used permanently or semi-permanently as the Send Node and which ones as the Receiving Node. Once so configured, it would be difficult to upgrade or re-configure the computer host system without replacing the Send Node or the Receive Node. In other words, one does not have the desired flexibility in configuring and upgrading the integrated system with the special-purpose send-only and receive-only computers. Network administrators and users often need flexibility and may want to speedily configure any network computers with readily available off-the-shelf components, without having to order and wait for the special purpose Send-Only or Receive-Only computers.

It is an object of the present invention to overcome the above described and other shortcomings in permanent installation of optical transmitter/receivers in a Send/Receive Node by providing a more efficient and flexible interface means between a data link and computers for a Send Node and a Receive Node in a secure one-way data transfer system.

It is yet another object of the present invention to provide a secure one-way data transfer system based on an interface means between a data link and computing platforms for a Send Node and a Receive Node that is easy to install and configure.

It is yet another object of the present invention to provide a secure one-way data transfer system based on an interface means between a data link and computing platforms for a Send Node and a Receive Node that allows the computing platforms to easily switch the Send/Receive functionality.

It is yet another object of the present invention to provide a secure one-way data transfer system based on an interface means between a data link and computing platforms for a Send Node and a Receive Node that is portable.

It is yet another object of the present invention to provide an interface means between a data link and computers for a Send Node and a Receive Node that is compatible with various standard data formats.

It is yet another object of the present invention to provide an interface means between a data link and computers for a Send Node and a Receive Node that is compatible with multiple computer operating systems and computing platform types.

It is yet another object of the present invention to provide an interface means between a data link and computers for a Send Node and a Receive Node that can be constructed using commercial off-the-shelf components that are easily configurable.

It is yet another object of the present invention to provide a means for easily identifying the Send or Receive-Only functionality of the interface means between a data link and computers for a Send Node and a Receive Node for a secure one-way data transfer system.

It is yet another object of the present invention to provide specially configured network interface circuitry for a Send Node and a Receive Node, respectively, that is to be coupled to the ends of a data link to enforce unidirectionality of data flow across the data link.

It is yet another object of the present invention to provide a secure one-way data transfer system based on specially configured network interface cards for connecting between a data link and computing platforms for a Send Node and a Receive Node.

It is yet another object of the present invention to provide a specially configured network interface circuitry for enforcing unidirectionality of data flow across a data link that is respectively coupled to computers for a Send Node and a Receive Node using standard interface connections.

It is yet another object of the present invention to provide a specially configured network interface circuits for enforcing unidirectionality of data flow across a data link that is respectively coupled to computers for a Send Node and a Receive Node based on PCI interface.

It is yet another object of the present invention to provide specially configured network interface circuits for enforcing unidirectionality of data flow across a data link that are respectively coupled to computers for a Send Node and a Receive Node based on a USB connection.

It is yet another object of the present invention to provide an interface means between an optical fiber, and computers for a Send Node and a Receive Node that enforces unidirectional data flow across the optical fiber data link.

It is yet another object of the present invention to provide an interface means between a shielded twisted pair copper wire communication cable, and computers for a Send Node and a Receive Node that enforces unidirectional data flow across the STP copper wire communication cable.

Other objects and advantages of the present invention will become apparent from the following description.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

SUMMARY OF THE INVENTION

Figure 1:
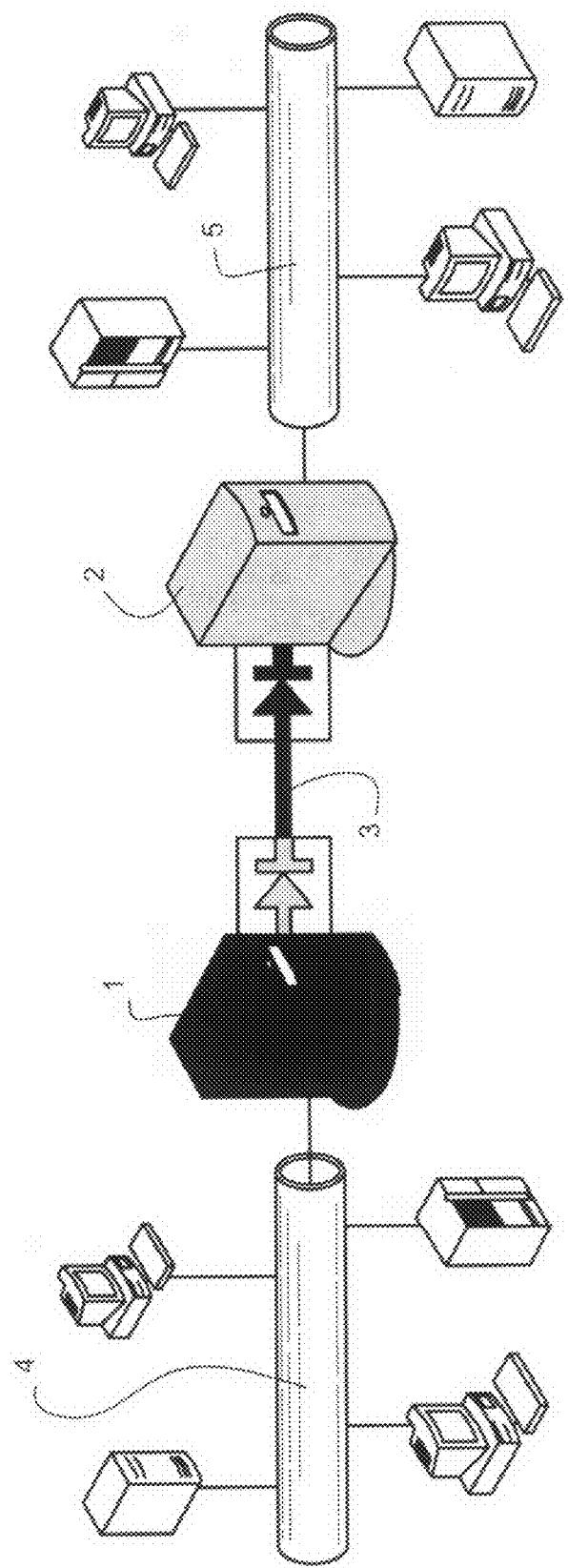
FIG. 1 schematically illustrates an example of a secure one-way data transfer system based on a one-way data link.

It has now been found that the above and related objects of the present invention are obtained in the form of several related aspects, including a secure one-way data transfer system using network interface circuitry.

More particularly, the present invention relates to network interface circuitry for a secure one-way data transfer from a Send Node to a Receive Node over a data link, comprising send-only network interface circuitry for transmitting data from the Send Node to the data link, and receive-only network interface circuitry for receiving the data from the data link and transmitting the received data to the Receive Node, wherein the send-only network interface circuitry is configured to be incapable of receiving any data from the data link, and the receive-only network interface circuitry is configured to be incapable of sending any data to the data link.

The send-only network interface circuitry in the network interface circuitry may comprise a data transmitter, a first interface to the Send Node, and a first interface circuit for controlling the flow of the data between the first interface and the data transmitter. Similarly, the receive-only network interface circuitry may comprise a data receiver, a second interface to the Receive Node, and a second interface circuit for controlling the flow of the data between the data receiver and the second interface.

The present invention is also directed to a secure one-way data transfer system, comprising a Send Node, a Receive Node, a data link, send-only network interface circuitry for transmitting data from the Send Node to the data link, wherein the send-only network interface circuitry interfaces the Send Node to the data link, and receive-only network interface circuitry for receiving the data from the data link and transmitting the received data to the Receive Node, wherein the receive-only network interface circuitry interfaces the data link to the Receive Node. The send-only network interface circuitry is configured to be incapable of receiving any data from the data link, and the receive-only network interface circuitry is configured to be incapable of sending any data to the data link.

The send-only network interface circuitry in the secure one-way data transfer system may comprise a data transmitter, a first interface to the Send Node, and a first interface circuit for controlling the flow of the data between the first interface and the data transmitter. Similarly, the receive-only network interface circuitry in the secure one-way data transfer system may comprise a data receiver, a second interface to the data bus of the Receive Node, and a second interface circuit for controlling the flow of the data between the data receiver and the second interface.

Furthermore, the present invention also relates to a method of configuring a network interface circuitry for secure one-way data transfer from a Send Node to a Receive Node over a data link, comprising the steps of providing a first and a second network interface circuitry, configuring the first network interface circuitry to enable data transfer from the Send Node to the data link, but disabling any data transfer from the data link to the Send Node, configuring the second network interface circuitry to enable data transfer from the data link to the Receive Node, but disabling any data transfer from the Receive Node to the data link, coupling the configured first network interface circuitry to the Send Node and a first end of the data link, and coupling the configured second network interface circuitry to the Receive Node and a second end of the data link.

DETAILED DESCRIPTION OF PREFERRED EMBODIMENTS

Figure 2:
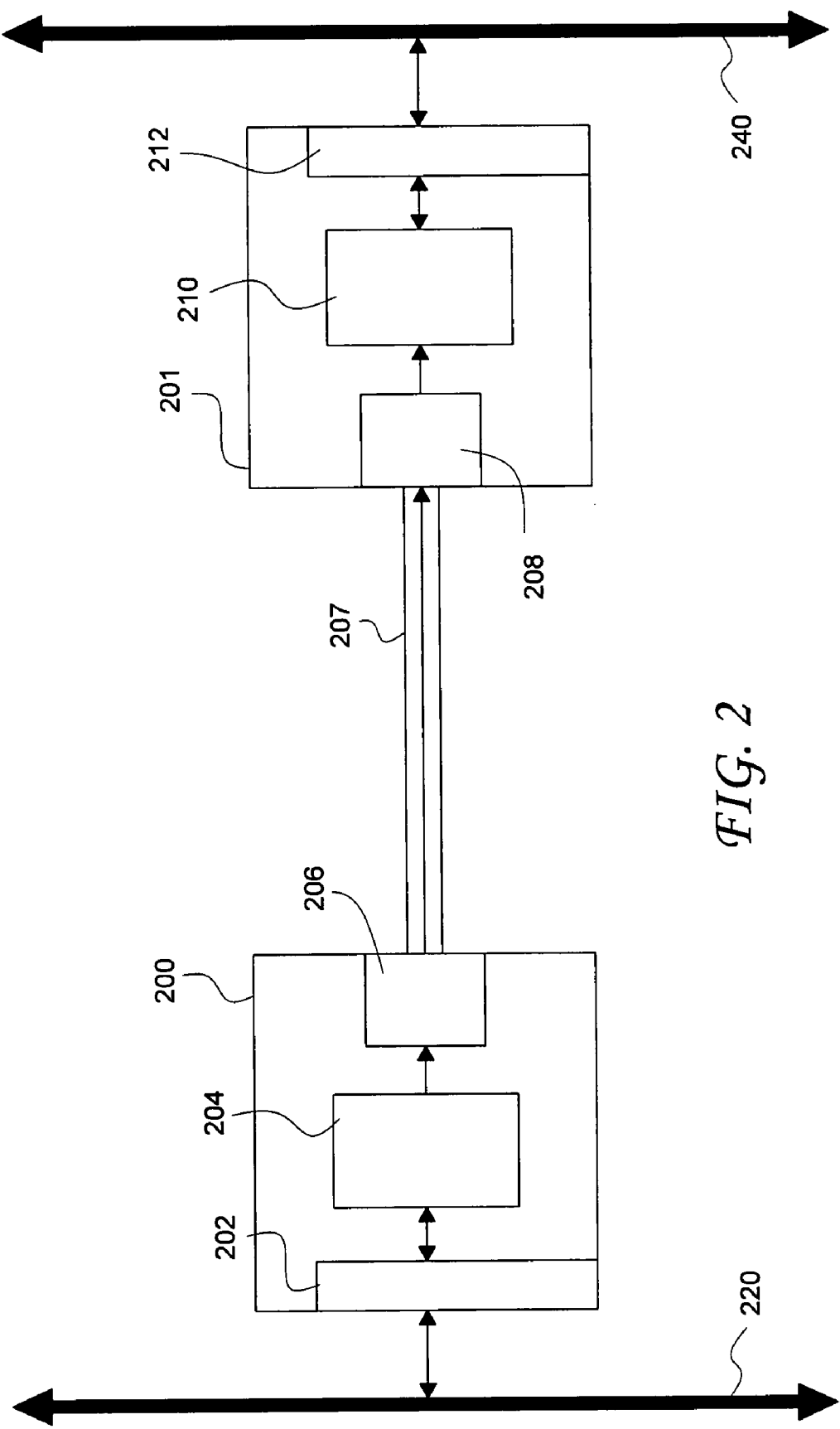
FIG. 2 is a schematic diagram of an embodiment of the present invention.

Illustrated in FIG. 2 is a schematic diagram of an embodiment of the present invention for a secure one-way data transfer system, comprising network interface circuitry between computers at a Send Node and a Receive Node and a data link 207. The system may operate on various operating systems or computing platform types, such as Microsoft Windows and the Unix-based operating systems (e.g., Solaris, Ultrix and Linux). The network interface circuitry 200 associated with a Send Node is configured only to send data to the data link 207, and the network interface circuitry 201 associated with a Receive Node is configured only to receive data from the data link 207 as follows.

The one-way data link 207 may comprise a high-bandwidth optical fiber. In this case, the send-only network interface circuitry 200 may be equipped with, or populated by, a phototransmission component such as an optical emitter 206. On the other hand, the receive-only network interface circuitry 201 may be equipped with, or populated by, a photodetection component such as an optical detector 208. The optical emitter 206 and optical detector 208 may be designed with integrated fiber optic connectors for coupling to the corresponding ends of an optical fiber. Since the send-only network interface circuitry 200 does not have any photodetection component and, likewise, the receive-only network interface circuitry 201 does not have any photoemission component, there is no possibility of reverse data flow from the Receive Node to the Send Node over the optical data link 207. In this way, unidirectionality of data flow from the Send Node to the Receive Node over the data link 207 can be strictly enforced.

One example of network interface circuitry embodying the present invention is a network interface card (NIC). A network interface card (NIC) typically comprises a circuit board populated with the necessary network interface circuitry thereon that can be easily coupled to or installed in a computer so that it can be connected to a network or to another computer. When two computers are connected via a NIC, the NIC typically provides a transparent interface between them. The computer presents data to the NIC so that it may be passed to another networked device and the NIC formats that data for transport over the media. Conversely, the NIC receives data from the networked computer and reformats it so that the computer can understand it. Network interface cards provide a dedicated, full-time connection between computers or to a network. Thus, most NICs are designed for a particular type of network, protocol, and media. Accordingly, NICs are suitable to achieve the object of the present invention. Two NIC circuit boards may be configured to be populated by necessary network interface circuitry to enable the Send-Only and the Receive-Only functionality for the Send Node and the Receive Node, respectively.

The network interface circuitry 200 and 201 are coupled to data bus in their corresponding Nodes or computing platforms through interfaces 202 and 212. Under the present invention, the interfaces 202 and 212 may be implemented in various ways in accordance with various interface standards. For example, the network interface circuitry 200 and 201 may comprise specially configured Peripheral Component Interconnect (PCI) cards having PCI interfaces 202 and 212 for coupling to the PCI bus in the computers for the Send Node and the Receive Node, respectfully. These specially configured PCI cards may be inserted into standard PCI bus slots in the host computers or otherwise can be easily installed inside the host computers. These PCI or other types of network interface cards may be designed to have a low form factor that allows these interface cards to fit, for example, upright in a 2U rack mount server chassis or to fit comfortably in other types of computing platforms for Send/Receive Nodes.

Alternatively, the interfaces 202 and 212 may comprise Universal Serial Bus (USB) connectors (e.g., USB 1.1, or USB 2.0 connectors) for coupling to the USB in the computers for the Send Node and the Receive Node, respectively. Other possible kinds of interface and interface standards that may be utilized in the network interface circuitry 200 and 201 include serial port connectors based on RS-232 standard and FireWire connectors (e.g., FireWire 400, or FireWire 800 connectors) based on IEEE 1394 standard. These connectors can be plugged into corresponding standard sockets in the host computers to access data bus in the host computers.

The network interface circuitry 200 associated with the Send Node may further comprise one or more interface chips or circuits necessary to process and control data flow from the interface 202 coupled to the Send Node to the optical emitter 206. Likewise, the network interface circuitry 201 associated with the Receive Node may also further comprise one or more interface chips or circuits necessary to process and control data flow from the optical detector 208 to the interface 212 coupled to the Receive Node. It will be appreciated by one skilled in the art that these interface chips or circuits may be implemented in various ways. For example, network interface circuitry 200 and 201 may comprise two specially configured Asynchronous Transfer Mode (ATM) network interface cards, each of which contains an ATM physical interface chip (also called PHY chip) and ATM segmentation and reassembly chip (also called SAR chip) to control the data flow. Although the ATM network interface cards are used to illustrate certain embodiments of the present invention in the following descriptions, the present invention is not limited to using the ATM network interface cards. Other alternative means for implementing the interface chips or circuits includes token ring, Ethernet, and any other suitable protocol that allows one-way data transfer in native or diagnostic configuration.

One-way data flow through the network interface circuitry 200 and 201 and the optical data link can be described as follows: Data to be transmitted from the Send Node to the Receive Node is first transferred from the data bus 220 in the computer at the Send Node to the interface 202 for the send-only network interface circuitry 200. The data is then transferred under the control of the interface circuit 204 to the optical emitter 206 to be transmitted across the optical link 207. The transmitted data is then received by the optical detector 208 of the receive-only network interface circuitry 201. Under the control of the interface circuit 210, the received data is then transferred to the data bus 240 of the computer at the Receive Node via the interface 212.

Figure 3:
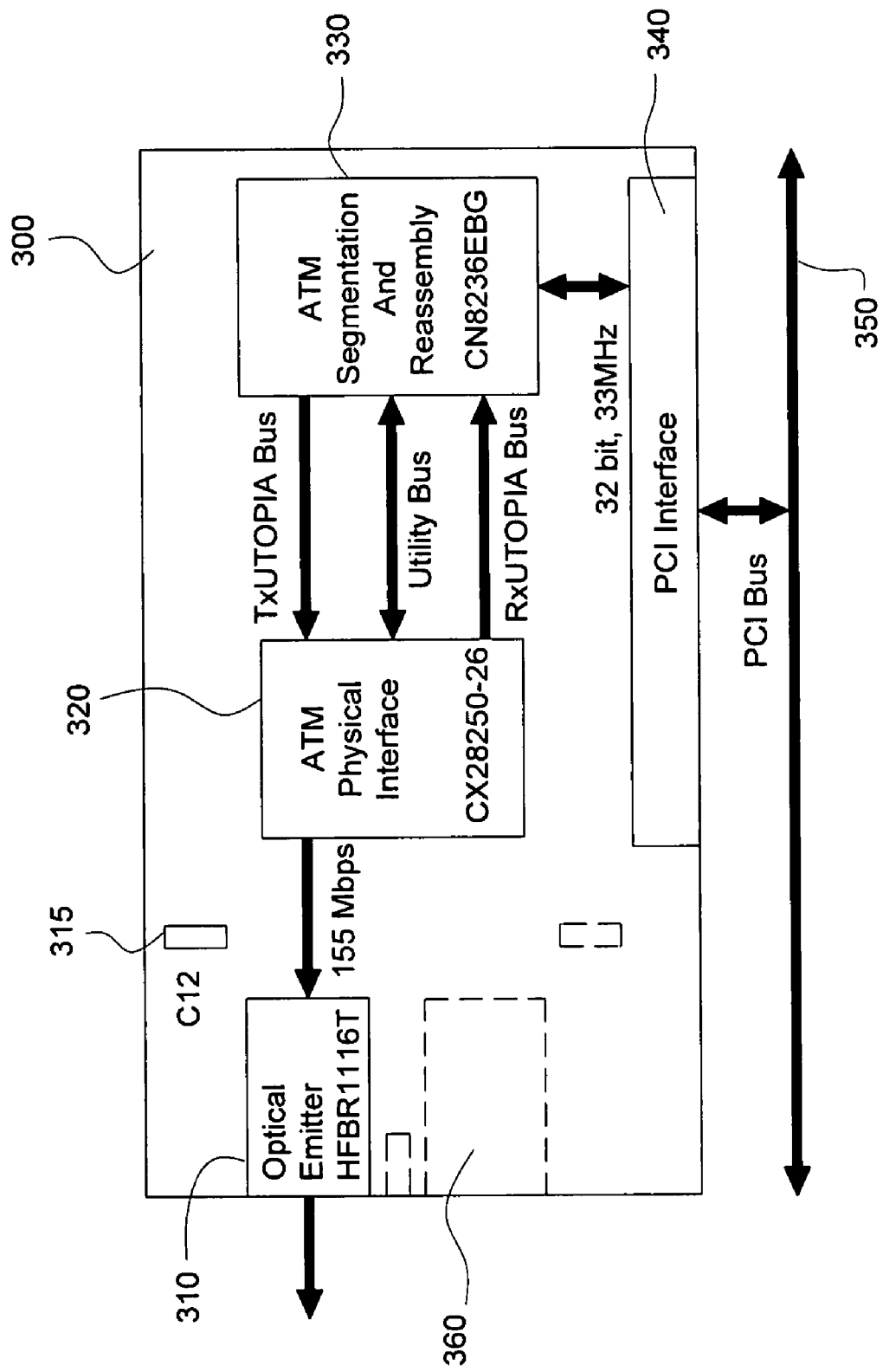
FIG. 3 is a functional block diagram of a send-only network interface card associated with a Send Node for an embodiment of the present invention using an optical data link as a one-way data link.
Figure 4:
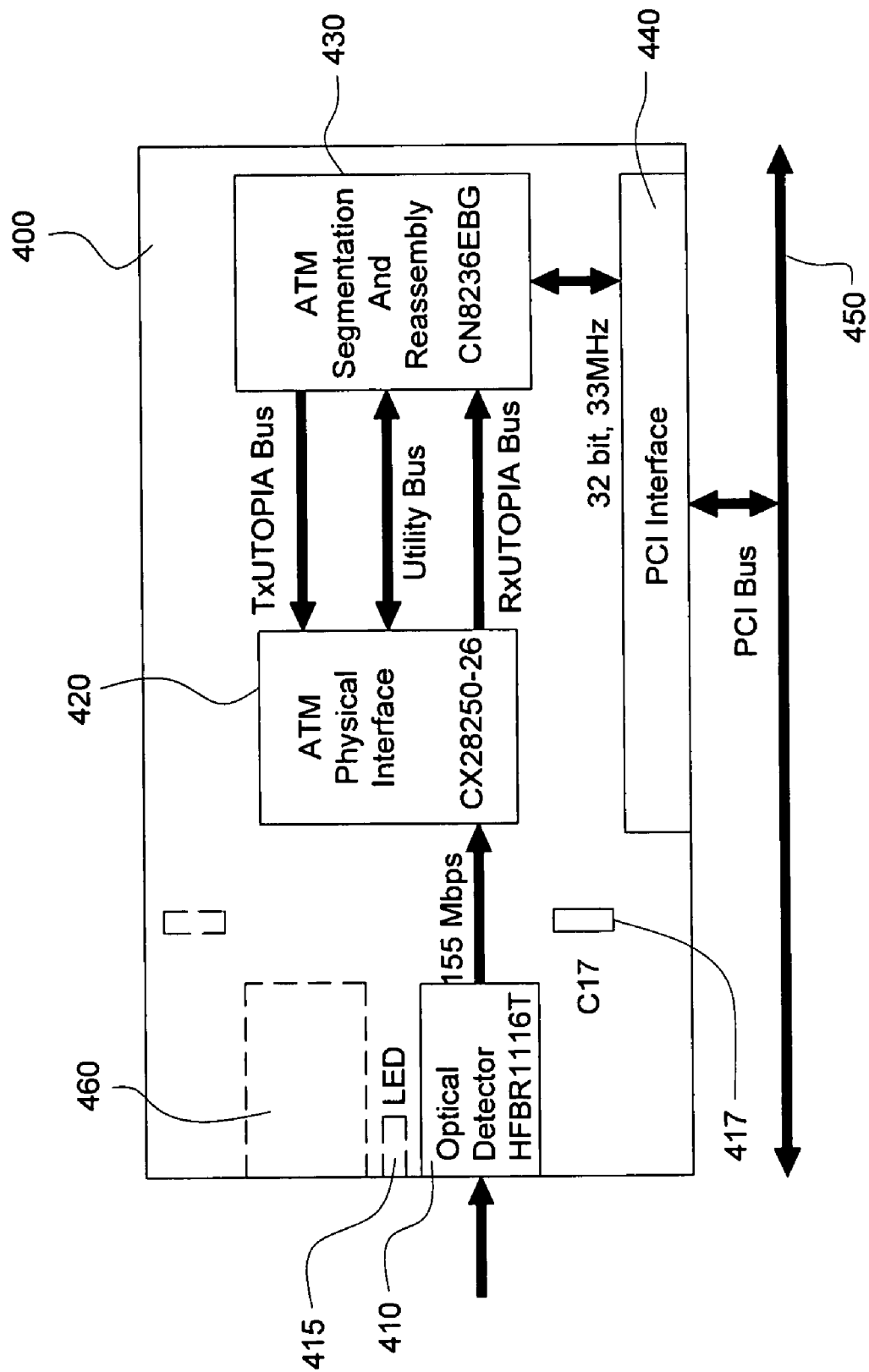
FIG. 4 is a functional block diagram of a receive-only network interface card associated with a Receive Node, which may be used in conjunction with the send-only network interface card shown in FIG. 3 for the embodiment of the present invention using an optical data link as a one-way data link.

FIG. 3 and FIG. 4 are directed to one particular exemplary embodiment of the present invention that can be used to implement a secure one-way data transfer system using an optical data link such as optical fiber. These figures respectively illustrate specially configured send-only and receive-only ATM network interface cards that may be used in conjunction with each other using PCI interface. Options for an ATM network interface card that may be used here include a standard 32 bit PCI card capable of data transfer at a rate of 155 Mbps, 64 bit PCI card, PCI express interface card, Industry Standard Architecture (ISA), Micro-Channel, and any other suitable input-output (I/O) interconnect bus to a computer. The network interface cards may have a low form factor suitable for fitting upright in a 2U rack mount server chassis or the like. The physical configuration of the network interface cards is different for the send-only and receive-only functions. While both the send-only and receive-only network interface cards may use the same underlying circuit board that allocates space for components for the send and receive functionalities, they can be configured for one function or the other by selectively installing only those components required for the send or receive functionality, but not both.

FIG. 3 illustrates a send-only network interface card generally designated by reference number 300, which is populated with the network interface circuitry configured for send-only functionality. The network interface circuitry for the send-only network interface card 300 may comprise a PCI interface 340 for receiving data from the PCI bus 350 of the computer at a Send Node, an ATM SAR chip 330 (e.g., Mindspeed CN8236EBG) for enabling data flow from and to the PCI interface 340, an ATM PHY chip 320 (e.g., Mindspeed CX28250-26) for controlling data flow from the ATM SAR chip 330, and an optical emitter 310 (e.g., Agilent HFBR1116T) designed with an integrated fiber optic connector to be coupled to the optical fiber data link. The data to be transmitted over the optical data link is transferred from the PCI bus 350 of the Send Node to the PCI Interface 340 and is provided to the optical emitter 310 via the ATM SAR and PHY chips 330 and 320 in the send-only network interface card 300. The optical emitter 310 sends the data to the optical data link to be transmitted over to a Receive Node. The space 360 formed within the dotted lines located below the optical emitter 310 on the send-only network interface card 300 is the space reserved for an optical receiver but remains unpopulated by it. This signifies the absence of an optical receiver on the send-only network interface card 300 to receive any data from the optical data link. There may be other network interface circuitry components, such as capacitor 315 (C12), whose presence is required for the send-only functionality and whose absence is required for the receive-only functionality (see FIG. 4). In this way, the send-only functionality of the send-only network interface card 300 is enforced.

FIG. 4 illustrates a receive-only network interface card generally designated by reference number 400, which is populated with the network interface circuitry configured for receive-only functionality. The network interface circuitry for the receive-only network interface card 400 may comprise an optical detector 410 (e.g., Agilent HFBR2116T) designed with an integrated fiber optic connector to be coupled to the optical fiber data link, a PCI interface 440 for sending data to the PCI bus 450 of the computer at a Receive Node, an ATM SAR chip 430 (e.g., Mindspeed CN8236EBG) for enabling data flow from and to the PCI interface 440, and an ATM PHY chip 420 (e.g., Mindspeed CX28250-26) for controlling data flow to the ATM SAR chip 430. The data transmitted by the send-only network interface card 300 associated with the Send Node is received by the optical detector 410 from the optical data link and transferred to the PCI interface 440 via the ATM PHY and SAR chips 420 and 430 in the receive-only network interface card 400. The PCI interface 440 then transfers the data to the PCI bus 450 of a computer at the Receive Node. The receive-only network interface card 400 may be equipped with light emitting diode (LED) 415 to indicate optical connectivity with the Send Node in operation. The space 460 formed within dotted lines located above the optical detector 410 on the receive-only network interface card 400 is the space reserved for an optical emitter but remains unpopulated by it. This signifies the absence of an optical emitter on the receive-only network interface card 400 to send any data to the optical data link. There may be other network interface circuitry components, such as capacitor 417 (C17), whose presence is required for the receive-only functionality and whose absence is required for the send-only functionality (see FIG. 3). In this way, the receive-only functionality of the receive-only network interface card 400 is enforced.

The send-only or receive-only functionality of the network interface card 300 and 400 may be indicated by color coding. For example, blue color may be designated for the send-only functionality and red for the receive-only functionality. Alternatively, silkscreen words or patterns may be placed on the network interface cards before they are populated and configured for a given functionality. These silkscreen words may be used as visual markings for identifying the send-only or receive-only functionality of the network interface card. Once the network interface cards with these silkscreen words placed thereon are populated with the send-only or receive-only network interface circuitry, the unpopulated space reserved for the components whose absence is required for the given functionality of the card will expose the underlying silkscreen words. These exposed silkscreen words may express the given functionality of the network interface card. These means for visual identification of the send-only or receive-only functionality allow a network administrator to easily identify and confirm with naked eye the functionality of a network interface card, without having to examine component by component of the network interface circuitry, and may further assure that proper network configuration be installed and maintained.

In an alternative embodiment of the present invention, instead of the PCI interface 340 and 440 in the send-only and receive-only network interface cards 300 and 400 as shown respectively in FIGS. 3 and 4, USB interface connection may be used in their place. In this case, a USB connector in the send-only network interface card is coupled to the standard USB socket in the computer at a Send Node and receives data to be transmitted over to a data link from a USB in the Send Node. Likewise, a USB connector in the receive-only network interface card is coupled to the USB socket in the computer at the Receive Node and transfers the data received from the data link to a USB in the Receive Node. Other components in the send-only and receive-only network interface circuitry such as the optical emitter/detector 310, 410 and the ATM chips 320, 330, 420, 430 may remain the same and may operate in conjunction with the USB connectors to implement secure one-way data transfer system.

Since the network interface circuitry based on USB connection (or the like such as FireWire, serial port connections) is external to the computing platforms at a Send Node or Receive Node and therefore may be physically exposed to potential tampering, special security consideration may be preferably given to prevent any attempt at reverse data flow from the Receive Node to the Send Node. In particular, separate administration of the USB-based send-only and receive-only network interface circuitry may allow a number of security configuration options. For example, each send-only or receive-only network interface circuitry may be associated with individual authorization keys that are issued to its own administrator. Such keys may be configured to selectively allow or disallow communications with other key holders. Each administrator is responsible for managing his own authorization keys, and if he loses his key, he can no longer communicate and a new one must be issued. Such authorization key system may be used to securely manage a variety of one-way data transfer scenarios. For example, a send-only and receive-only network interface circuitry may be issued as matched pairs, incapable of communicating with any other network interface devices. Alternatively, a plurality of send-only network interface devices may be issued with authorization keys that allow data transfer to only one receive-only network interface device. It will be appreciated by one skilled in the art that various other secure one-way data transfer configurations may be possible under the authorization key system.

Figure 5:
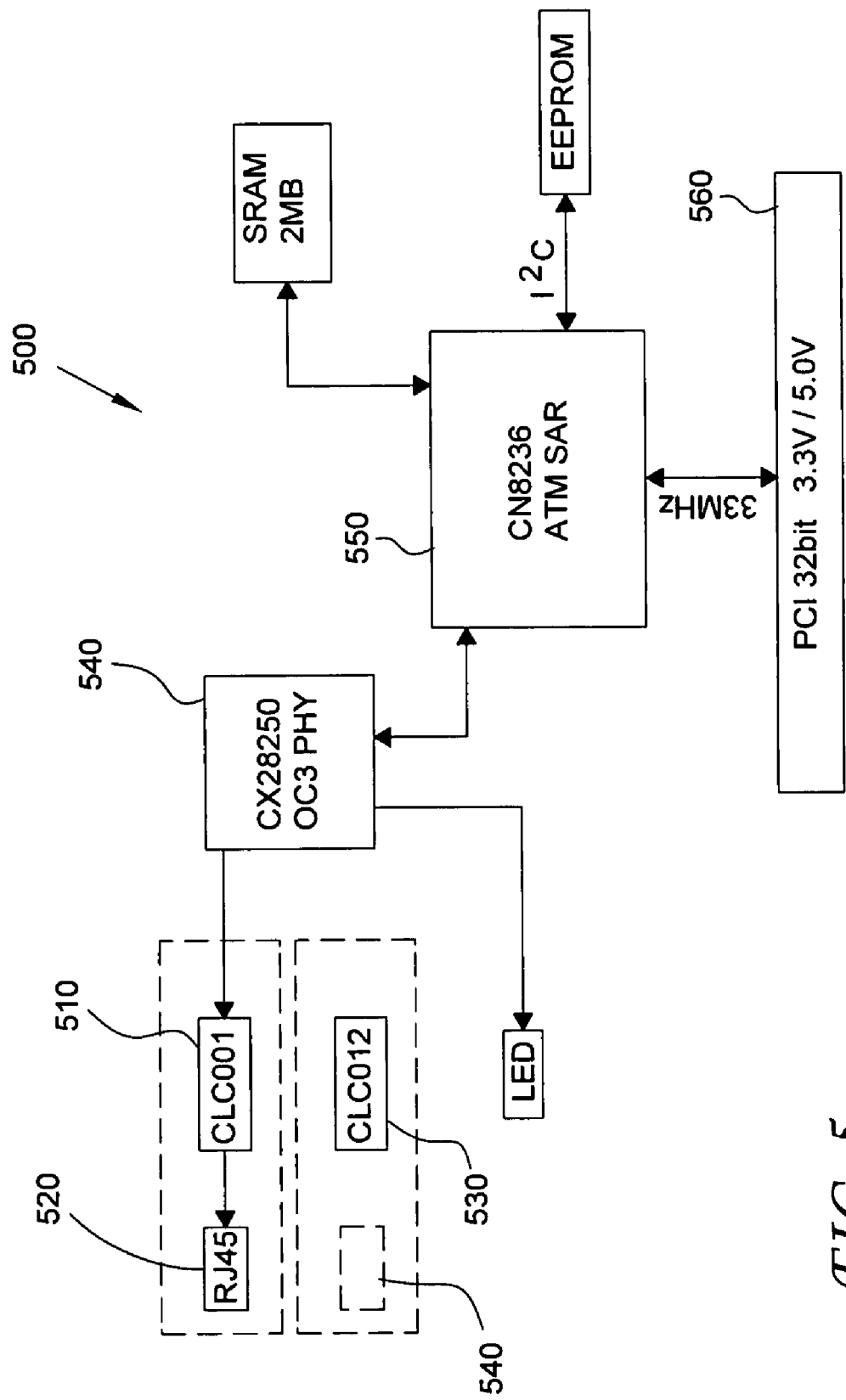
FIG. 5 is a functional block diagram of a send-only network interface circuitry for an alternative embodiment of the present invention using a shielded twisted pair copper communication cable as a one-way data link.
Figure 6:
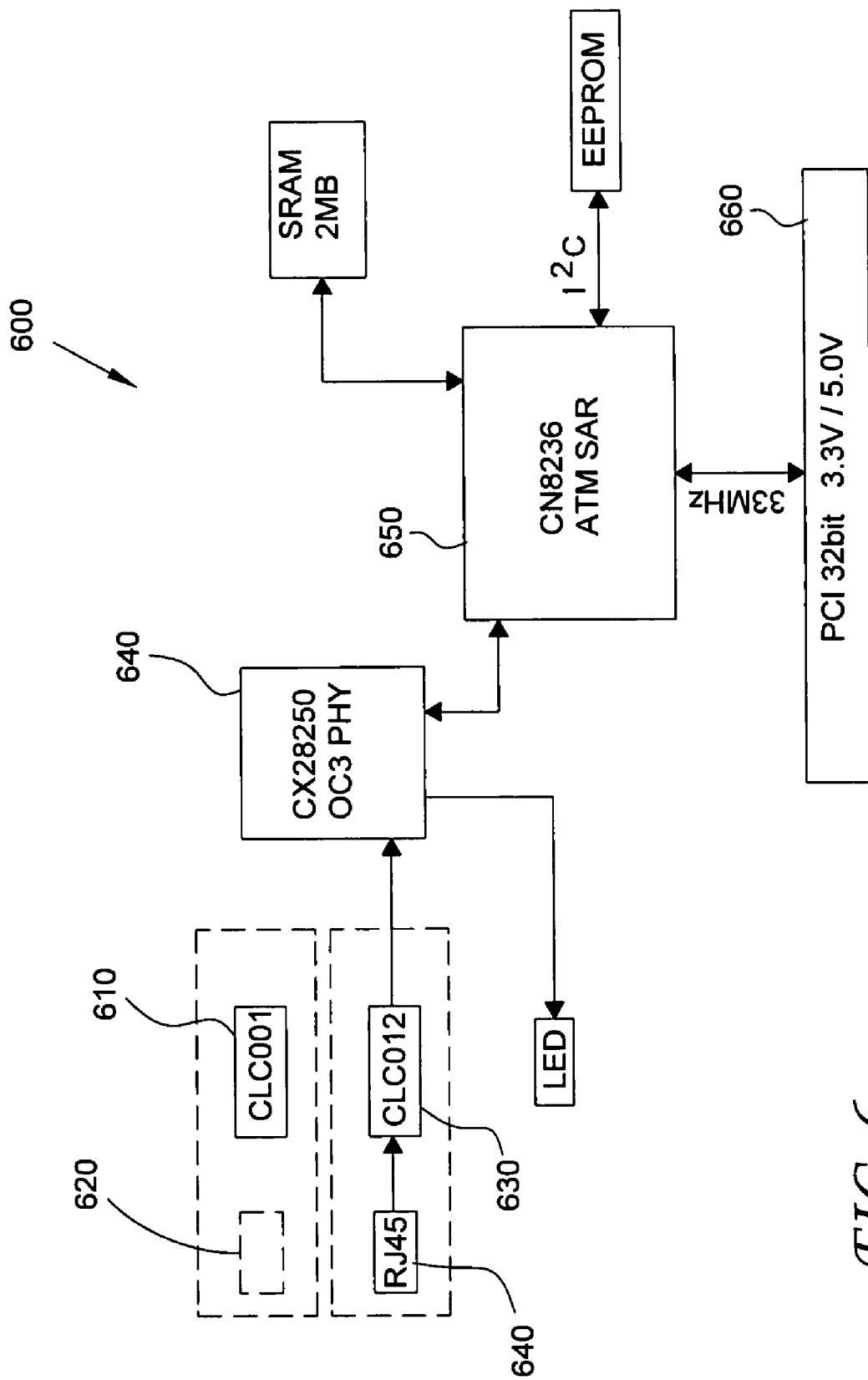
FIG. 6 is a functional block diagram of a receive-only network interface circuitry that may be used in conjunction with the send-only network interface circuitry shown in FIG. 5 for the alternative embodiment of the present invention using a shielded twisted pair copper communication cable as a one-way data link.

In another alternative embodiment of the present invention, network interface circuitry is provided for secure one-way data transfer across a shielded twisted pair (STP) copper wire communication cable. FIG. 5 and FIG. 6 respectively illustrate specially configured send-only and receive only ATM network interface cards using PCI interface for secure one-way data transfer across a STP copper wire communication cable. FIG. 5 illustrates a send-only network interface card generally designated by reference number 500, which is configured for send-only functionality. The network interface circuitry for the send-only network interface card 500 may comprise a PCI interface 560 for receiving data from a Send Node, an ATM SAR chip 550 (e.g., Mindspeed CN8236EBG) for enabling data flow from and to the PCI interface 560, and an ATM PHY chip 540 (e.g., Mindspeed CX28250 OC3) for controlling data flow from the ATM SAR chip 550. For coupling to the STP copper wire communication cable, the send-only network interface card 500 may be equipped with serial digital cable driver (CLC001) 510, adaptive cable driver (CLC012) 530, and a RJ45 connector 520.

Conventional network interface components may be designed to use a pair of RJ45 connectors in the FIG. 5 configuration. Under the embodiment of the present invention illustrated in FIG. 5, only one RJ45 connector 520 is maintained in the send-only network interface card 500, and the space 540 reserved for another RJ45 connector is kept unpopulated.

A typical RJ 45 connector is for bilateral connection with the corresponding send and receive contacts. To enforce the send-only functionality, only the send contact portion of the RJ45 connector 520 is wired or otherwise coupled to the serial digital cable driver 510 to receive data from it and send to the STP copper wire communication cable. However, the receive contact portion of the RJ45 connector 520 is disabled by not being wired or otherwise connected to the serial digital cable driver 510. In this configuration, no data can be received by the RJ45 connector 520 from the STP copper wire communication cable to be transmitted to the serial digital cable driver 510. The data to be transmitted over the STP copper wire communication cable is transferred from the Send Node to the PCI Interface 560 and is provided to the send contact portion of the RJ45 connector 520 via the ATM SAR and PHY chips 550 and 540 and the serial digital cable driver 510 in the send-only network interface card 500.

FIG. 6 illustrates a receive-only network interface card generally designated by reference number 600, which is configured for receive-only functionality. The network interface circuitry for the receive-only network interface card 600 may comprise a PCI interface 660 for sending data to the computer at a Receive Node, an ATM SAR chip 650 (e.g., Mindspeed CN8236EBG) for enabling data flow from and to the PCI interface 660, and an ATM PHY chip 640 (e.g., Mindspeed CX28250 OC3) for controlling data flow to the ATM SAR chip 650. For coupling to the STP copper wire communication cable, the receive-only network interface card 600 may also be equipped with serial digital cable driver (CLC001) 610, adaptive cable driver (CLC012) 630, and a RJ45 connector 640.

Conventional network interface components may be designed to use a pair of RJ45 connectors in the FIG. 6 configuration. Under the embodiment of the present invention illustrated in FIG. 6, only one RJ45 connector 640 is maintained in the receive-only network interface card 600, and the space 620 reserved for another RJ45 connector is kept unpopulated.

To enforce the receive-only functionality, only the receive contact portion of the RJ45 connector 640 is wired or otherwise coupled to the adaptive cable driver 630 to transmit thereto data from the STP copper wire communication cable. However, the send contact portion of the RJ45 connector 640 is disabled. In this configuration, no data can be sent by the RJ45 connector 620 to the STP copper wire communication cable. The data transmitted by the send-only network interface card 500 associated with the Send Node is received by the receive contact portion of the RJ45 connector 640 from the STP copper wire communication cable and transferred to the PCI interface 660 via the adaptive cable driver 630 and the ATM PHY and SAR chips 640 and 650 in the receive-only network interface card 600. The PCI interface 660 then transfers the data to the Receive Node.

As discussed above in connection with the embodiment of the present invention illustrated in FIGS. 3 and 4, the send-only or receive-only functionality of the network interface card 500 and 600 may be indicated by color coding. For example, blue color may be designated for the send-only functionality and red for the receive-only functionality. Alternatively, silkscreen words or patterns may be placed on the network interface cards before they are populated and configured for a given functionality. These silkscreen words may be used as visual markings for identifying the send-only or receive-only functionality of the network interface card. Once the network interface cards with these silkscreen words placed thereon are populated with the send-only or receive-only network interface circuitry, the unpopulated space, such as space 540 in FIG. 5 and space 620 in FIG. 6, may be designed to expose the underlying silkscreen words expressing the given functionality of the network interface card. These means for visual identification of the send-only or receive-only functionality allow a network administrator to easily identify and confirm with naked eye the functionality of a network interface card, without having to examine component by component of the network interface circuitry, and may further assure that proper network configuration be installed and maintained.

Figure 7:
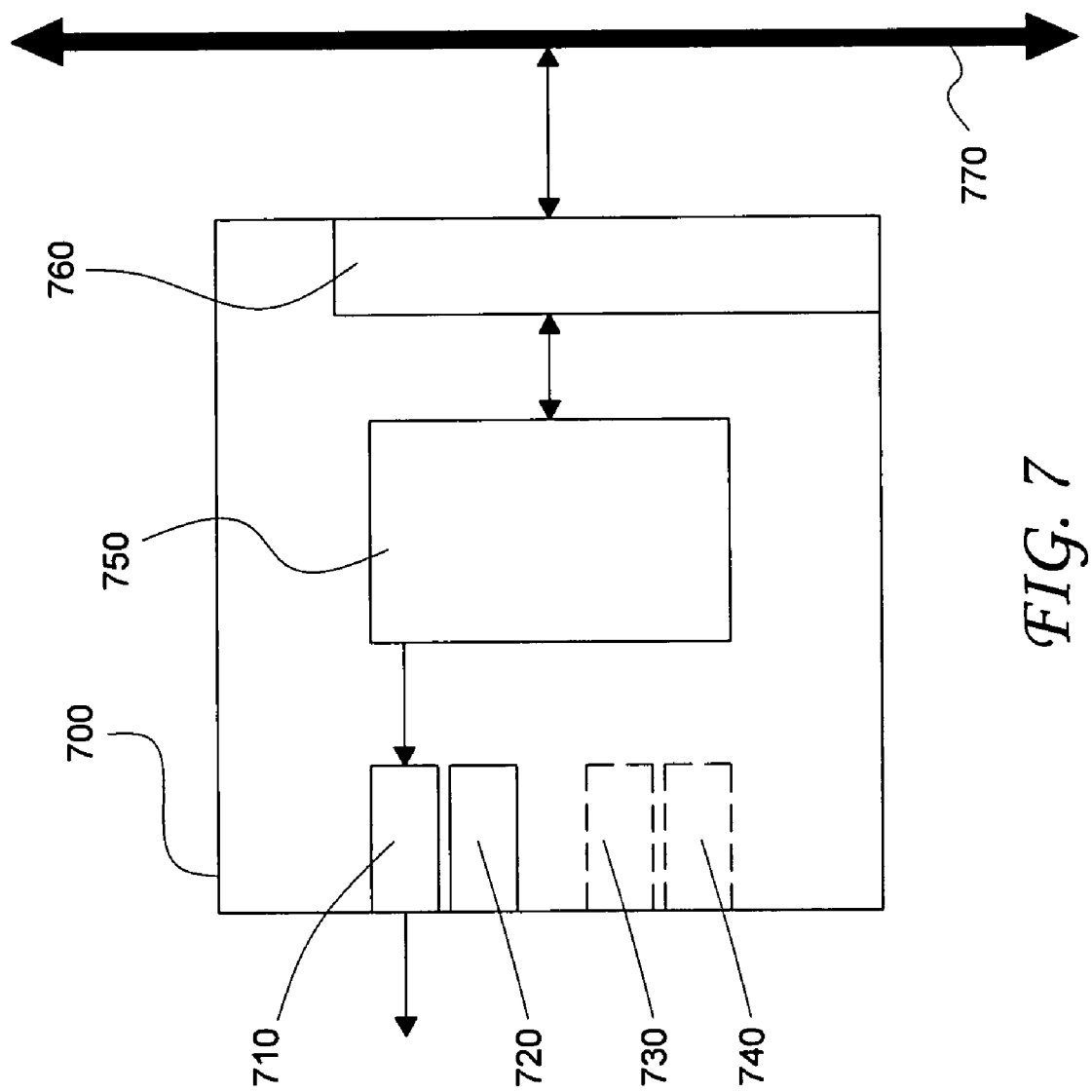
FIG. 7 is a functional block diagram of a send-only network interface card associated with a Send Node for yet another alternative embodiment of the present invention using an optical data link as a one-way data link.
Figure 8:
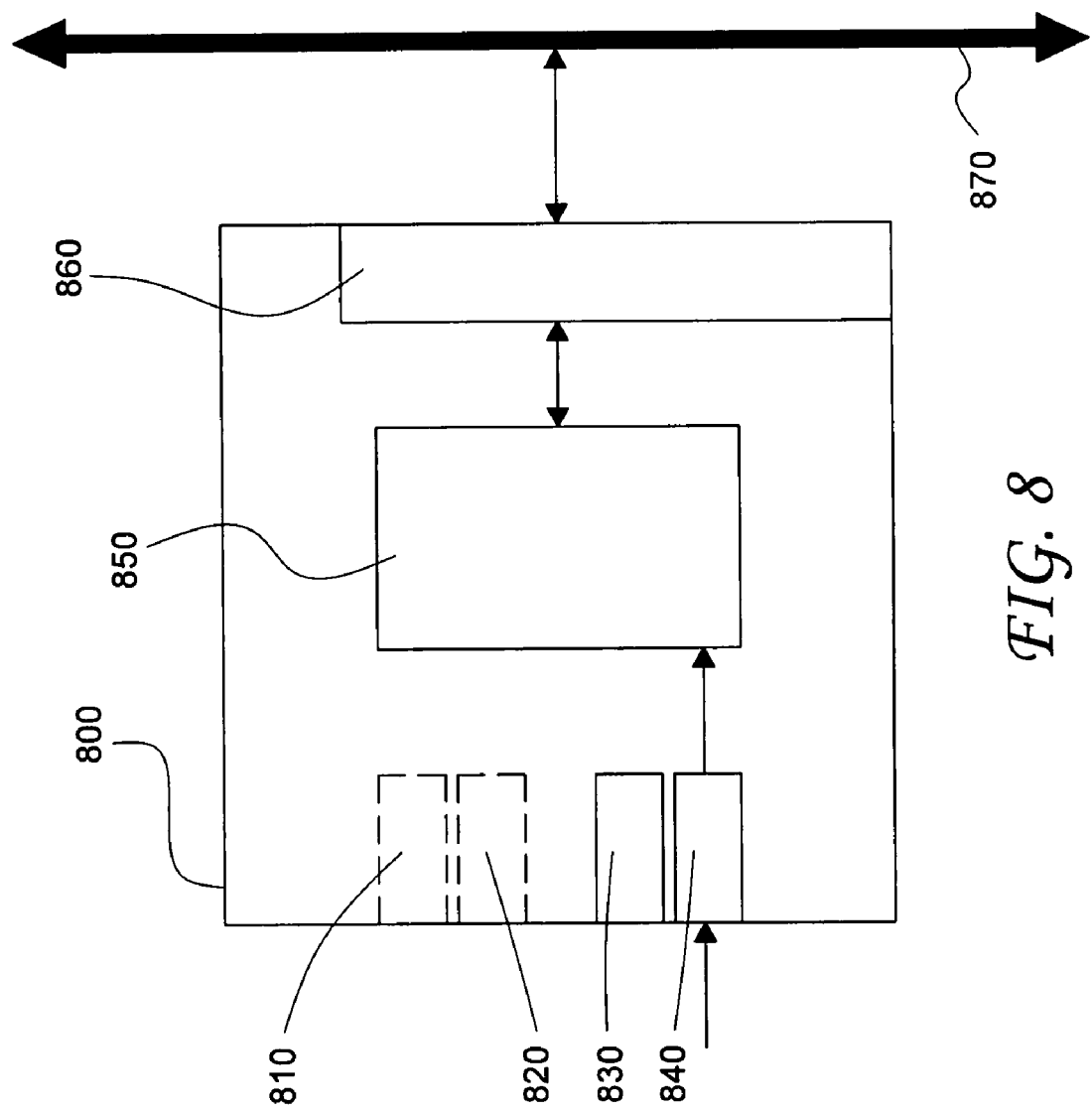
FIG. 8 is a functional block diagram of a receive-only network interface card associated with a Receive Node, which may be used in conjunction with the send-only network interface card shown in FIG. 7 for the yet another alternative embodiment of the present invention using an optical data link as a one-way data link.

FIGS. 7 and 8 schematically illustrate yet another exemplary embodiment of the present invention based on a network interface card originally designed for holding two pairs of an optical emitter and an optical receiver for an optical data link, somewhat analogous to the embodiment discussed above in connection with FIGS. 5 and 6 for a STP copper wire communication cable. FIG. 7 illustrates a send-only network interface card generally designated by reference number 700. In this embodiment of the present invention, a pair of an optical emitter 710 and an optical detector 720 may be kept within the send-only network interface card 700. The space reserved for another pair of an optical emitter 730 and an optical detector 740 is kept unpopulated. To enforce the send-only functionality of the send-only network interface card 700, the optical detector 720 is disabled or otherwise disconnected from the interface circuit 750 so that no data from the optical data link can be transmitted to the interface circuit 750. Only the optical emitter 710 is enabled and is connected to the interface circuit 750. In this configuration, data transferred from data bus 770 in the computer at the Send Node through an interface 760 for the send-only network interface card 700 is sent to the optical emitter 710 under the control of the interface circuit 750 to be transmitted over an optical data link. The interface 760 and the interface circuit 750 may comprise any suitable components, including the components described above in connection with FIGS. 2 and 3.

FIG. 8 illustrates a receive-only network interface card generally designated by reference number 800. In this embodiment of the present invention, a pair of an optical emitter 830 and an optical detector 840 may be kept within the send-only network interface card 800. The space reserved for another pair of an optical emitter 810 and an optical detector 820 is kept unpopulated. To enforce the receive-only functionality of the receive-only network interface card 800, the optical emitter 830 present in the receive-only network interface card 800 is disabled or otherwise disconnected from the interface circuit 850 so that no data from the interface circuit 850 can be transmitted to an optical data link. Only the optical detector 840 is enabled and is connected to the interface circuit 850. In this configuration, the data from the Send Node transmitted over the optical data link is received by the optical detector 840 of the receive-only network interface circuitry 800. Under the control of the interface circuit 850, the received data is then transferred to the data bus 870 of the computer at the Receive Node via the interface 860. The interface 860 and the interface circuit 850 may comprise any suitable components, including the components described above in connection with FIGS. 2 and 4.

As discussed above, the send-only or receive-only functionality of the network interface card 700 and 800 may be indicated by color coding. Alternatively, silkscreen words or patterns may be placed on the network interface cards before they are populated and configured for a given functionality. These silkscreen words may be used as visual markings for identifying the send-only or receive-only functionality of the network interface card. Once the network interface cards with these silkscreen words placed thereon are populated with the send-only or receive-only network interface circuitry, the unpopulated space, such as space 730, 740 in FIG. 7 and space 810, 820 in FIG. 8, may be designed to expose the underlying silkscreen words expressing the given functionality of the network interface card. These means for visual identification of the send-only or receive-only functionality allow a network administrator to easily identify and confirm with naked eye the functionality of a network interface card, without having to examine component by component of the network interface circuitry, and may further assure that proper network configuration be installed and maintained.

While this invention has been described in conjunction with exemplary embodiment s outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of transferring data from a Send Node to a Receive Node over an optical data link, comprising the steps of:
   providing a first and a second network interface circuitry;
   configuring said first network interface circuitry to enable data transfer from said Send Node to said optical data link, but to disable any data transfer from said optical data link to said Send Node;
   configuring said second network interface circuitry to enable data transfer from said optical data link to said Receive Node, but to disable any data transfer from said Receive Node to said optical data link;
   coupling said configured first network interface circuitry to said Send Node and a first end of said optical data link;
   coupling said configured second network interface circuitry to said Receive Node and a second end of said optical data link; and
   transferring data from said Send Node to said Receive Node over said optical data link,
   wherein said first network interface circuitry and said second network interface circuitry are separately administered and require independent authentication keys for communication management;
   said step of configuring said first network interface circuitry comprises the steps of:
      populating a first optical emitter and a first optical detector on a first network interface card;
      configuring said first optical emitter to enable data transfer from said Send Node to said optical data link;
      configuring said first optical detector to disable any data transfer from said optical data link to said Send Node;
      leaving a space on said first network interface card for a second optical emitter and a second optical detector unpopulated; and
   said step of configuring said second network interface circuitry comprises the steps of:
      populating a third optical emitter and a third optical detector on a second network interface card;
      configuring said third optical emitter to disable any data transfer from said Receive Node to said optical data link;
      configuring said third optical detector to enable data transfer from said optical data link to said Receive Node;
      leaving a space on said second network interface card for a fourth optical emitter and a fourth optical detector unpopulated.

2. The method of claim 1, wherein said step of coupling said configured first network interface circuitry comprises the step of using a PCI interface.

3. The method of claim 1, wherein said step of coupling said configured second network interface circuitry comprises the step of using a PCI interface.

4. The method of claim 1, wherein said step of coupling said configured first network interface circuitry comprises the step of using a USB connector.

5. The method of claim 1, wherein said step of coupling said configured second network interface circuitry comprises the step of using a USB connector.

6. The method of claim 1, wherein said step of coupling said configured first network interface circuitry comprises the step of using a FireWire connector.

7. The method of claim 1, wherein said step of coupling said configured second network interface circuitry comprises the step of using a FireWire connector.

8. The method of claim 1, wherein said step of coupling said configured first network interface circuitry comprises the step of using a serial port connector.

9. The method of claim 1, wherein said step of coupling said configured second network interface circuitry comprises the step of using a serial port connector.

10. The method of claim 1, wherein said providing step comprises the step of providing two ATM network interface cards.

11. The method of claim 10, wherein said step of providing said ATM network interface cards comprises the step of providing an ATM physical interface chip and an ATM segmentation and reassembly chip on each of said two ATM network interface cards.

12. The method of claim 1, wherein said providing step comprises the step of providing a first and a second network interface cards in form of unpopulated circuit boards.

13. The method of claim 12, wherein said providing step further comprises the step of placing silkscreen words on said unpopulated circuit boards.

14. The method of claim 1, wherein said providing step comprises the step of providing a first and a second network interface cards having a low form factor.

15. A system for transferring data from a Send Node to a Receive Node over an optical data link, comprising:
a first network interface circuitry which is configured to enable data transfer from said Send Node to said optical data link, but to disable any data transfer from said optical data link to said Send Node, and is coupled to said Send Node and a first end of said optical data link; and
a second network interface circuitry which is configured to enable data transfer from said optical data link to said Receive Node, but to disable any data transfer from said Receive Node to said optical data link, and is coupled to said Receive Node and a second end of said optical data link,
wherein:
said first network interface circuitry and said second network interface circuitry are separately administered and require independent authentication keys for communication management;
said first network interface circuitry comprises a first optical emitter and a first optical detector populated on a first network interface card;
said first optical emitter is configured to enable data transfer from said Send Node to said optical data link;
said first optical detector is configured to disable any data transfer from said optical data link to said Send Node;
said first network interface card comprises an unpopulated space thereon for a second optical emitter and a second optical detector;
said second network interface circuitry comprises a third optical emitter and a third optical detector populated on a second network interface card;
said third optical emitter is configured to disable any data transfer from said Receive Node to said optical data link;
said third optical detector is configured to enable data transfer from said optical data link to said Receive Node; and
said second network interface card comprises an unpopulated space thereon for a fourth optical emitter and a fourth optical detector.

16. The system of claim 15, wherein said first network interface circuitry is coupled to said Send Node by a PCI interface.

17. The system of claim 15, wherein said second network interface circuitry is coupled to said Receive Node by a PCI interface.

18. The system of claim 15, wherein said first network interface circuitry is coupled to said Send Node by a USB connector.

19. The system of claim 15, wherein said second network interface circuitry is coupled to said Receive Node by a USB connector.

20. The system of claim 15, wherein said first network interface circuitry is coupled to said Send Node by a FireWire connector.

21. The system of claim 15, wherein said second network interface circuitry is coupled to said Receive Node by a FireWire connector.

22. The system of claim 15, wherein said first network interface circuitry is coupled to said Send Node by a serial port connector.

23. The system of claim 15, wherein said second network interface circuitry is coupled to said Receive Node by a serial port connector.

24. The system of claim 15, wherein each of said first network interface circuitry and said second network interface circuitry comprises an Asynchronous Transfer Mode (ATM) network interface circuit.

25. The system of claim 24, wherein said ATM network interface circuit comprises an ATM physical interface chip and an ATM segmentation and reassembly chip.

26. The system of claim 15, wherein silkscreen words indicating the send-only functionality are placed on said unpopulated space on said first network interface card.

27. The system of claim 15, wherein silkscreen words indicating the receive-only functionality are placed on said unpopulated space on said second network interface card.

28. The system of claim 15, wherein said first network interface card has a low form factor.

29. The system of claim 15, wherein said second network interface card has a low form factor.

* * * * *